April 1, 1930.  G. HUDSON  1,752,849
TRACTOR PLOW
Filed Aug. 20, 1926
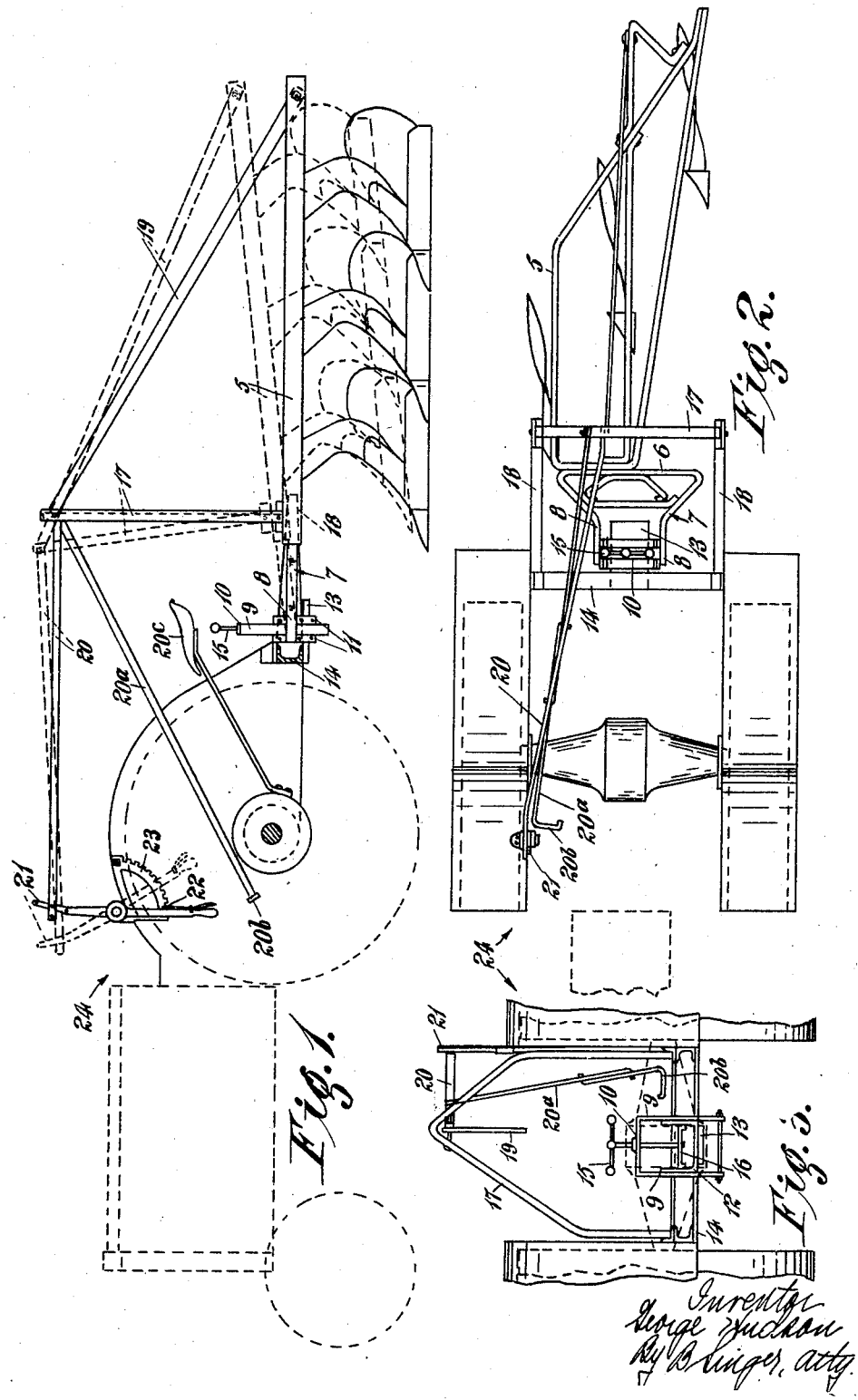

Patented Apr. 1, 1930

1,752,849

UNITED STATES PATENT OFFICE

GEORGE HUDSON, OF BOONGALIE, MERBEIN SOUTH, VICTORIA, AUSTRALIA

TRACTOR PLOW

Application filed August 20, 1926, Serial No. 130,503, and in Australia August 22, 1925.

This invention relates to improvements in tractor attachments for use in raising and lowering plows and other cultivating implements, the object of the invention being to provide improved apparatus of this kind by means of which the depth at which the implements operate in the soil may be controlled and regulated by imposing a part of the weight of the tractor on the implement drawn thereby when this becomes necessary, so that the weight of the tractor is employed to push the implement into the soil, another object being to provide improved means of this kind which are effective and readily operated for lifting the implement out of and from the ground.

With the above and other objects in view, the invention consists in the construction, combination and arrangmeent of devices hereinafter described and claimed.

In the accompanying drawings

Fig. 1 is a diagrammatic elevation, partly in section, of a tractor plow constructed and arranged in accordance with my invention.

Fig. 2 is a plan of the same.

Fig. 3 is a rear elevation of the same, omitting the plow mechanism.

The plow frame 5 is rigidly secured to the transverse member 6 of the horizontally arranged bow frame 7, the limbs 8 of which bow frame are each pivotally attached by suitable means to the vertical side members 9 of the inverted U-frame 10 which is adjustable vertically between the side guide plates 11 attached to the limbs of the U-plate 12 which latter is rigidly secured to horizontal plate 13 rigidly attached to the rear transverse bar 14 of the chassis tractor. The vertical adjustment of said inverted U-frame 10 is effected by rotation of the hand screw 15 screw threaded through the bridging member of said frame and having its lower end rotatably secured to the bridging plate 16 rigidly secured with the U-plate 12.

The lever mechanism for raising and lowering the rear end of the plow frame 5 consists of a vertically arranged swinging element here shown as a bow frame 17, the limbs of which are pivotally secured to the longitudinally disposed spaced arms 18 which extend rearwardly from the bar 14. Proceeding rearwardly from the upper end of said frame 17 is a rigid bar 19, the rear end of which is attached to the rear end of the plow frame 5. The swinging element 17 is swung forwardly and rearwardly to raise and lower the plow beam 5 by means of the rigid bar 20 attached to the upper end of said swinging element 17, and also to the upper end of the quadrant lever 21, the retaining pawl 22 of which latter operates over the quadrant rack 23 rigidly fixed to any suitably disposed rigid member on the tractor 24.

It will be understood that by means of the quadrant lever 21 and its connections the weight of the tractor can be utilized to force the earth working implement or implements into the ground to any depth desired, so that the earth working implements cannot only be lifted out and up from the ground by said lever and its connections, but can also be pushed into the ground. Actuation of the swinging element or bow frame 17 can also be effected by means of the foot lever 20$^a$ attached to the upper end of said swinging element and extending forwardly and downwardly and shown being provided with a terminal foot pedal 20$^b$. This foot lever 20$^a$ can conveniently be made extensible longitudinally whereby the foot pedal 20$^b$ can be conveniently located for any particular driver the seat for whom is fixed as shown at 20$^c$.

I claim:

A tractor having a chassis provided with a transverse bar and with a pair of spaced arms extending rearwardly from said bar, a U-frame secured rigidly to said transverse bar at a point between said arms, an inverted U-frame secured on said U-frame for vertical adjustment and also guided by said U-frame, a trailing implement frame, a transverse member to which the front end of said implement frame is rigidly secured, said transverse member having forwardly extending arms pivotally connected to said inverted U-frame for vertical angular movement of said trailing frame, a swinging element pivotally connected to said first named arms, a connection between said swinging element and the rear portion of said trailing frame and an operating lever mounted on said tractor and connected to said swinging element.

Dated this 24th day of July, 1926.

GEORGE HUDSON.